UNITED STATES PATENT OFFICE.

CARL STOEHR, OF KIEL, ASSIGNOR TO THE FARBENFABRIKEN, VORMALS FR. BAYER & CO., OF ELBERFELD, GERMANY.

DIMETHYLPIPERAZIN TARTRATE.

SPECIFICATION forming part of Letters Patent No. 523,018, dated July 17, 1894.

Application filed April 5, 1894. Serial No. 506,403. (Specimens.)

*To all whom it may concern:*

Be it known that I, CARL STOEHR, doctor of philosophy, and docent at the University of Kiel, Prussia, Germany, a subject of the Emperor of Germany, residing at Kiel, Prussia, Germany, assignor to the FARBENFABRIKEN, VORMALS FR. BAYER & CO., of Elberfeld, Germany, have invented a new and useful Improvement in the Manufacture of a new Pharmaceutical Product; and I do hereby declare the following to be a full, clear, and exact description thereof.

My invention relates to the production of a new pharmaceutical product which is obtained from combining organic acids especially tartaric acid with dimethylpiperazin (described in my United States Letters Patent No. 514,632, dated February 13, 1894).

In carrying out my invention practically I proceed as follows: 11.4 parts, by weight, of dimethylpiperazin are mixed with a solution prepared by dissolving fifteen parts, by weight of tartaric acid in thirty parts, by weight, of water. The reaction mixture grows hot, while the tartaric acid combines with dimethylpiperazin forming the tartaric salt (tartrate) of dimethylpiperazin. On cooling, the latter salt separates in compact prismatic crystals which contain three molecules of water and correspond with the formula:

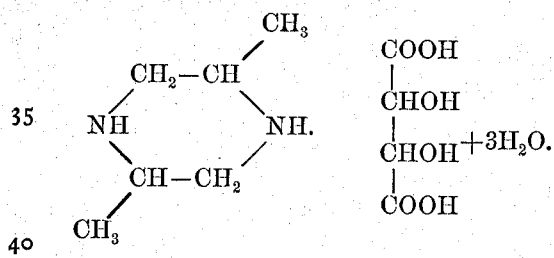

This product is heated during some time at about 100° centigrade until the water of crystallization is given off. After pulverizing, the mass freed from water forms a white product, which is easily soluble in water, insoluble in alcohol and ether and corresponds with the formula:

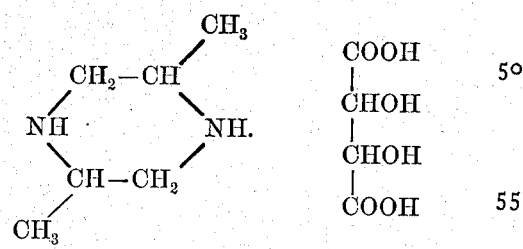

The melting point of this salt is 242° to 243° centigrade.

Of course, other organic acid salts of dimethylpiperazin as for example the citric acid salt (citrate) can be obtained according to the aforesaid manner or in an analogous or similar manner. The tartrate of dimethylpiperazin is employed for pharmaceutical purposes and is effective in a similar manner as dimethylpiperazin or salts thereof. It is especially applied in cases of lithiasis, urinary concretions and the uric acid diathesis.

The daily doses are about thirty grains to be given in divided doses, well diluted with water. Of course, the doses may be varied according to the gravity of the cases.

Having now described my invention and in what manner the same is to be performed, what I claim as new, and desire to secure by Letters Patent, is—

1. The process for the production of a new pharmaceutical product by combining one molecular proportion of tartaric acid with one molecular proportion of dimethylpiperazin substantially as described.

2. As a new article of manufacture the pharmaceutical product being the tartrate of dimethylpiperazin which has the formula:

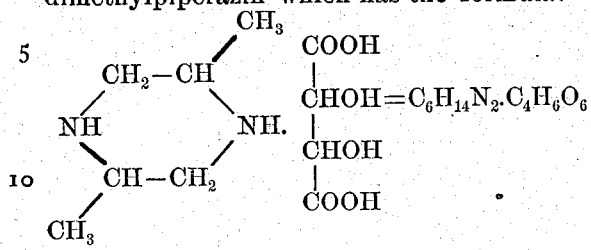

which salt, when water free and pulverized forms a white powder, easily soluble in water, insoluble in alcohol and ether, melting at 242° to 243° centigrade.

In testimony whereof I have signed my name in the presence of two subscribing witnesses.

CARL STOEHR.

Witnesses:
AUGUST BLANK,
THILO KROEBER.